| United States Patent [19] | [11] Patent Number: 4,497,919 |
| Varga et al. | [45] Date of Patent: Feb. 5, 1985 |

[54] EMULSION POLISH COMPOSITIONS

[75] Inventors: Stephen I. Varga, Evanston; Donald P. Mattz, Chicago, both of Ill.

[73] Assignee: Turtle Wax, Inc., Chicago, Ill.

[21] Appl. No.: 534,788

[22] Filed: Sep. 22, 1983

[51] Int. Cl.³ .......................... C09G 1/04; C09G 1/08; C09G 1/10; C09G 1/12
[52] U.S. Cl. ...................................... 524/10; 252/8.57; 524/42; 524/45; 524/46; 524/72; 524/221; 524/313; 524/339; 524/444; 524/456
[58] Field of Search ................... 524/42, 276, 10, 277, 524/221, 72, 313, 339, 37, 45, 46, 444, 456, 506, 500, 516, 538, 539, 588; 252/8.57; 106/5, 10, 11

[56] References Cited

U.S. PATENT DOCUMENTS

| 2,511,695 | 6/1950 | Canfield | 524/276 |
| 2,907,664 | 10/1959 | Schoenholz et al. | 106/11 |
| 3,467,532 | 9/1969 | Varsanyi et al. | 252/8.57 |
| 3,931,079 | 6/1976 | Wise et al. | 106/10 |
| 4,055,433 | 10/1977 | Morones | 106/11 |
| 4,265,663 | 5/1981 | Gilicinski et al. | 524/276 |

*Primary Examiner*—Allan M. Lieberman

[57] ABSTRACT

A water-in-oil emulsion polish composition suitable for treating natural and synthetic leather articles comprises a wax mixture, a film-forming agent, a film-modifying agent, a nonionic emulsifying agent, a dispersing agent, a thickening agent, a solvent, and a preservatives in water. The composition is substantially self-polishing and provides a durable natural-looking high gloss.

18 Claims, No Drawings

EMULSION POLISH COMPOSITIONS

TECHNICAL FIELD

This invention relates to emulsion polish compositions suitable for treating natural and synthetic leather articles. More particularly, the compositions are water-in-oil emulsions suitable for use as shoe cream polish compositions for providing a durable finish and gloss with a minimum of buffing required.

BACKGROUND OF THE INVENTION

A great number of finished leather products require maintenance polishes to preserve, clean and waterproof them. Footwear, in particular, requires a leather-care product that helps prevent the leather from drying out and forming unsightly cracks in the creases of the shoe uppers. Shoe polishes, therefore, are used to impart a high-gloss, maintain the supple hand of the leather, and increase the leather's resistance to weathering, scuffing and scratching.

One of the problems of conventional shoe polishes is providing, on a flexible surface, a protective finish which is both lustrous, durable, and water-resistant. The majority of shoe polishes are of the solvent paste type based on solvents and waxes. While solvent pastes clean the shoe well while the paste is being applied, the resulting film dries to a dull finish and must be buffed to produce a high natural shine. A further disadvantage of the solvent paste polishes is that the protective effect they produce is only temporary. Consequently, they must be applied frequently in order to properly protect the footwear leather.

Another disadvantage of a wax-based shoe polish is that the finish tends to deluster on exposure to moisture from rain, water splashing or puddles. Additionally, layers of wax can build up on the leather surface. This resulting buildup resists subsequent reapplications of polish, thus extensive buffing is required in order for a new layer of polish to properly "take" on the leather.

Some attempts have been made to overcome the drawbacks of solvent paste polishes by formulating emulsion cream polishes. These polishes are emulsions of waxes, solvents and water. However, the finish produced suffers from the same drawbacks as those obtained from other wax-based polishes.

Further attempts to overcome the drawbacks of wax-based polishes include the formulation of self-polishing or dry-bright liquids. Self-polishing liquids are generally comprised of a blend of a fairly soft acrylic polymer emulsion, a rosin adduct leveling resin, a wax emulsion (frequently a low molecular weight polyethylene emulsion) and modifiers, such as a leveling plasticizer and a coalescing solvent. The ratio of polymer/resin/wax is varied depending on the degree of buffability desired. Usually, a higher wax content gives the polish better buffing properties. The liquid polishes clean the shoes well, particularly when they are applied with foam sponge applicators which provide abrasive cleaning. The emulsions apply a film of glossy polish that, in most cases, does not require buffing to obtain a high shine. However, the shine produced tends to have an unnatural, plastic-like appearance.

Thus, there is a need for self-polishing liquids and emulsion cream products that provide a flexible finish coating having a natural high gloss that is durable and scuff-proof.

SUMMARY OF THE INVENTION

This invention contemplates an emulsion-type polish composition suitable for treating natural and synthetic leather articles that provides a durable high-gloss finish that is substantially self-polishing. More particularly, the present polish composition is a water-in-soil (w/o) emulsion comprising a wax mixture, a film-forming agent, a film-modifing agent, a nonionic emulsifying agent, an anionic dispersing agent, a thickening agent, a solvent, a preservative and water. The composition can also contain pigments and dyes to provide a coloring shoe polish.

The composition is substantially a drip-free emulsion cream. Surprisingly, the composition retains the natural, mirror-like sheen benefits traditionally associated with wax polishes without the corresponding drawbacks previously described. Further, the composition provides the benefits of flexible, durable films associated with appropriately plasticized polymer and resin films as disclosed herein, while providing a natural-looking, durable high gloss on the treated leather surface.

The term "leather" as used herein includes natural animal leather and any of the synthetic leather-like materials used by those skilled in the art for covering shoes, boots and like footwear. In its presently preferred use, the composition is applied to footwear but is not meant to be so limited. It is to be understood that the present composition can be used to treat such leather articles as handbags, belts, chair seats, gloves, saddles, bridles, book bindings, artwork trappings, suitcases, briefcases, and the like, having a glossy finish. The term "self-polishing" as used herein means that the composition produces a highly glossy film on air drying. The treated leather can be lightly buffed to speed up the drying process, but buffing is not necessary. It is to be understood that the term "buffing" and its various grammatical forms refers to the use of cloth, sponges, brushes and the like commonly used by consumers to rub leather articles to a high sheen finish.

Still further benefits and advantages will become apparent to those who are skilled in the art from the detailed description of the invention, the examples, and the claims which follow.

DESCRIPTION OF PREFERRED EMBODIMENTS

The polish composition of this invention is a water-in-oil (w/o) emulsion constituted by:

(a) a wax mixture of about 1 part by weight mineral ester wax having an acid value of about 0 to about 55, about 4 parts by weight partly saponified mineral ester wax having an acid value of about 10 to about 45, about 1.5 parts by weight insect wax having an acid value of about 0.2 to about 24;

(b) a film-forming agent that is a curable material selected from the group consisting of a curable emulsion polymer, a curable resin, a curable aminofunctional silicone, and mixtures thereof;

(c) a film-modifying agent that is a surfactant selected from the group consisting of a surface-active aminofunctional silicone, a linear arylalkyl modified polydialkyl siloxane, a linear alkylated copolymer of vinylpyrrolidone with a long chain ($C_{12}$ to $C_{22}$) alpha olefin, and mixtures thereof;

(d) a nonionic emulsifying agent having an HLB* value of about 10 to about 15 and selected from the group consisting of an oil-soluble polyglycerol ester of a hydrophobic fatty acid capable of forming a w/o emulsion, a water-soluble $C_8$ to $C_{18}$ alkylphenol ether with ethylene oxide having an average number of ethylene oxide units of of about 5 to about 70, and mixtures thereof;

*HLB-hydrophile-lipophile balance.

(e) an effective amount of an anionic water-soluble dispersing agent;

(f) a thickening agent selected from the group consisting of a colloidal alkali metal or alkaline earth metal aluminum silicate, a water-soluble nonionic or anionic ester or ether of cellulose, and mixtures thereof;

(g) an organic solvent selected from the group consisting of a liquid aliphatic hydrocarbon, a liquid aromatic hydrocarbon, and an oleoresinous liquid having an average kauri-butanol value above 50, and mixtures thereof;

(h) an effective amount of a preservative; and (i) deionized water.

The composition can further include a $C_8$ to $C_{12}$ alkylolamide that is the reaction product of about 2 moles of $C_2$ to $C_{12}$ alkanolamine and about 1 mole of $C_6$ to $C_{20}$ fatty acid, and effective amounts of a dye. The term "dye" as used herein includes water-soluble dyes, oil-soluble dyes, pigments and mixtures thereof capable of producing a coloring shoe polish.

"Wax mixture" as used herein refers to the above ratio of waxes in combination present in the final product. Thus, the waxes can be either premixed and then added to the composition during manufacture, or the individual waxes can be added sequentially to provide the aforementioned ratio in the final product. A particularly preferred embodiment of this invention comprises a wax mixture present in an amount of about 6 to about 7 weight percent, preferably above 6.2 to about 6.8 weight percent, in the composition.

Waxes which can be employed in the polish compositions of this invention are well known to those skilled in the art. Examples of suitable mineral ester waxes include montan, ozocerite (ceresin), paraffin (oxidized), microcrystalline (oxidized) and synthetic waxes such as ethylenic polymers (oxidized polyethylene), polyol ether-esters and mixtures thereof. A particularly preferred montan wax is commercially available from the American Hoechst Corporation, Industrial Chemicals Division sold under the trademark Hoechst Wax E, F, KPS, KSL, RT, KST ester wax series. Particularly preferred is Hoechst Wax F having an acid value of 6 to 10.

Acid value is the measure of the free fatty acidity, and represents the number of milligrams of potassium hydroxide that are required to neutralized the free fatty acid contained in one gram of an oil or fat. The analytical methods for determining acid value are well known in the art and need not be described herein.

Suitable mineral ester waxes that are partly saponified are available commercially from the American Hoechst Corporation, Industrial Chemicals Division as the montan-based series marketed under the trademark Hoechst Wax OP, O, OM, FL. Particularly preferred is Hoechst Wax OM having an acid value of 20 to 25. Examples of suitable insect waxes include beeswax, Chinese insect wax and shellac wax. Particularly preferred is natural beeswax having an acid value of about 17 to about 24.

It is to be understood that synthetic wax substitutes having the same physical-chemical constants as the corresponding natural wax can be used in the composition in place of the natural wax for economic considerations and are intended to fall within the scope of this invention. It is further to be understood that the properties of the composition can be varied, as desired, by including animal waxes such as spermaceti and its synthetic substitutes, mink oil, lanolin and the like; vegetable waxes such as carnauba, candelilla, bayberry, jojoba oil, hydrogenated jojoba oil and its synthetic substitutes, and sugar cane wax.

In a preferred embodiment of the invention, the wax mixture comprises about 1 part by weight of a mineral ester wax having an acid value of about 6 to about 10, about 4 parts by weight of a partly saponified mineral ester wax having an acid value of about 20 to about 25, about 1.5 parts by weight insect wax having an acid value from about 17 to about 24. Particularly preferred is a wax mixture comprising about 1 part by weight montan wax having an acid value of about 6 to about 10, about 4 parts by weight partly saponified montan-based wax having an acid value of about 20 to about 25, and about 1.5 parts by weight beeswax having an acid value of about 17 to about 24.

The w/o emulsion of this invention can be prepared by conventional techniques well known in the art. An appropriate procedure is described below in Example 1. Persons skilled in the art will appreciate that the amount of water present can vary in a range of about 25 to 75 weight percent as required for the product form desired. The compositions of this invention have exceptionally good product performance with respect to speed of application, quality of gloss, and durability of the finish.

It is believed that the excellent product performance results from the combination of the various individual components as disclosed herein. Specifically, it is believed that the product performance is partly due to the wax mixture as disclosed herein in combination with nonionic emulsifying agents selected from the group consisting of oil-soluble polyglycerol esters of hydrophobic fatty acids, water-soluble alkylphenol ethers having an average number of ethylene oxide units of about 5 to about 70 and mixtures thereof, the oil-soluble emulsifying agent being capable of forming a w/o emulsion. It is to be understood that the term "fatty acids" includes fatty acids derived from animal fats, and vegetable oils as well as free fatty acids. It is to be understood further that the term "hydrophobic fatty acids" includes the aforementioned acids, as well as resin acids, naphthenic acids and mixtures thereof. See, for example, Schwartz and Perry, *Surface-Active Agents*, published by Interscience Publishers, Inc., 1949.

A preferred embodiment comprises about 0.5 to about 2.5 weight percent, preferably about 0.5 to about 2.0 weight percent, nonionic emulsifying agent selected from the group consisting of an ester of an unsaturated $C_{18}$ fatty acid with a glycerin polymer containing an average of 4 glycerin units, and a $C_8$ to $C_9$ alkylphenol ether having an average number of ethylene oxide units of about 12 to about 13, and mixtures thereof. A particularly preferred w/o emulsifying agent is Witconol 14, described by Material Number 18 in the glossary below, preferably present in amounts of about 1 to about 2 weight percent, more preferably in the range of about 1.4 to about 1.6 weight percent.

It is also believed that the product performance is due in part to the combination of emulsion polymer film-forming agents and surface-active polymeric film-modifying agents described herein. The exact interaction between the components and the proportions present in the formula is not fully understood. However, the film-modifying agents are believed to function not only as plasticizers for the film-forming agents but as auxiliary film-forming agents as well.

In a preferred embodiment, the film-forming agents comprise about 0.2 to about 8 solids weight percent, preferably about 7.2 to about 7.5 solids weight percent, selected from the group consisting of cyclized rubbers, acrylic ester polymers, drier modified alkyd resins aminofunctional silicone resins and mixtures thereof. Examples of particularly preferred commercially available film-forming agents are described in the glossary below by material numbers 1, 2, 11, 12, 13 and 14.

In another preferred embodiment, the film-modifying agent comprises about 0.05 to about 0.5 solids weight percent, preferably from about 0.05 to about 0.4 solids weight percent, selected from the group consisting of a surface active aminofunctional silicone, a nonreactive, linear arylalkyl modified polydi($C_1$ to $C_4$ alkyl)siloxane, a linear alkylated copolymer of vinylpyrrolidone with a long chain ($C_{12}$ to $C_{16}$) alpha olefin, and mixtures thereof. Particularly preferred film-modifying agents are the $C_{16}$ alkylated vinylpyrrolidone copolymers having an average molecular weight ranging from about 7,300 to about 8,600 and commercially available under the trademark Ganex ®. Specifically preferred film-modifying agents are described in the glossary below by Material Number 7 and Material Number 15.

Dispersing agents are commonly used in polish compositions and such ingredients are well known to the skilled artisan. For the compositions of this invention, however, anionic dispersing agents that are water-soluble and hydrocarbon insoluble are preferred, present in an amount in the range of about 0.05 to about 0.15 weight percent, preferably about 0.08 to about 0.12 weight percent. A specifically preferred dispersing agent is illustrated in the glossary below by Material Number 6.

In the presently preferred embodiment, the viscosity of the composition is controlled by means of thickening agents included in amounts of about 0.01 to about 0.5 weight percent, preferably about 0.15 to about 0.35 weight percent, selected from the group consisting of a colloidal alkaline earth metal aluminum silicate, a water-soluble nonionic ether of cellulose, a water-soluble anionic ester of cellulose and mixtures thereof. Suitable examples of thickening agents are described in the glossary below by Material Number 4, Material Number 10, and Material Number 17. Such thickeners are well known in the art as being capable of forming thixotropic, non-dripping liquids, creams, and pastes.

The viscosity of the present compositions can be further increased by including nonionic wetting agents commonly known as high activity alkylolamides that are the reaction product of 2 moles of a $C_8$ to $C_{12}$ alkanolamine and 1 mole $C_6$ to $C_{20}$ fatty acid or fatty acid oil, present in an amount of about 0.3 to about 0.7 weight percent. A particularly preferred alkylolamide is a reaction product of 2 moles diethanolamine and 1 mole coconut oil and is illustrated in the glossary below by Material Number 5.

Suitable organic solvents commonly employed in polish formulations are well known in the art. In a preferred embodiment, a solvent that is a member of the group consisting of an aliphatic liquid hydrocarbon, an aromatic liquid hydrocarbon and an oleoresinous liquid having an average kauri-butanol value above 50 are preferably present in an amount of about 4 to about 20 weight percent, preferably about 12 to about 20 weight percent.

The solvent power of hydrocarbons is expressed in terms of kauri-butanol values, a term well-known to those skilled in the art. Methods of determining the kauri-butanol values are also well-known and need not be described herein. Exemplary organic solvents include aliphatic hydrocarbon liquids such as mineral spirits and dipentene; aromatic hydrocarbon liquids such as toluene, xylene, and naphtha; oleoresinous liquids such as pine oil and turpentine; and halogenated hydrocarbons, such as methylene chloride and perchloroethylene. See, for example, Kirk-Othmer, *Encyclopedia of Chemical Technology,* Volume 21, third edition, Chapter on Industrial Solvents, published by the Interscience Encyclopedia, Inc. and Scheflan and Jacobs, *The Handbook of Solvents,* published by D. Van Nostrand Co. in 1953. A particularly preferred solvent is an oleoresinous solvent, such as steam-distilled turpentine having a kauri-butanol value of about 56.

The composition can also contain abrasives, corrosion inhibitors, alcoholic co-solvents, fragrance and other ingredients normally used in making polishes selected for their purposes well known to the skilled artisan. It should also be noted that although the compositions of this invention have been described in connection with liquids, creams and paste forms, it is not necessarily so limited. It is to be understood that the compositions can be prepared as pressurized products for use as aerosol polishes in combination with the appropriate propellent mixture and dispenser valve. It is further to be understood that pigments can be included to provide opaque hiding power particularly for use in polishes for children's shoes.

This invention is further illustrated in the following examples, which are not intended to be limited.

BEST MODES FOR CARRYING OUT THE INVENTION

A. Glossary of Materials

In the examples which follow, certain components of the composition are referred to, for easy reference and convenience, by their commercial trademark designation, common name or CTFA name as provided immediately here below. CTFA names are defined in the CTFA Cosmetic Ingredient Dictionary, Third Edition, published by Cosmetic, Toiletry and Fragrance Association, Inc. incorporated herein by reference.

1. Acryloid B-67MT: An acrylic ester polymer dispersed in mineral thinner, sold by Rohm & Haas Company, Inc., Philadelphia, Pa.

2. Alpex C-8415: A cyclized rubber, sold by the American Hoechst Corporation, Somerville, N.J.

3. Beeswax: Puriifed wax rendered from the honeycomb of the Apidae (honeybee), having an acid value of about 17 to about 24 and a melting point of about 62 to about 65 degrees C.

4. Cellulose gum: CTFA name for an anionic sodium salt of the polycarboxymethyl ester of cellulose (CAS #9004-32-4), such as the CMC series, sold by Hercules, Inc., Wilmington, Del.

5. Cocamide DEA: CTFA name for a mixture of ethanolamides of coconut oil (CAS #61791-31-9; 68603-42-9), such as the high activity alkylolamides, sold by the Stepan Company, Northfield, Ill., under the NINOL ® trademark, Series AA-62 EXTRA, 2012 EXTRA, P621 and 1128 EXTRA.

6. Darvan #2: A sodium salt of polysulfonated lignin (CAS #8061-51-6), sold by the R. T. Vanderbilt Company, Inc., Norwalk, Conn.

7. Ganex®V-216: A linear alkylated copolymer of vinylpyrrolidone and a $C_{16}$ alpha olefin having an average molecular weight of about 7,300 dispersed in toluene, sold by the GAF Corporation, New York, N.Y. CTFA name: PVP/Hexadecene copolymer.

8. Hoechst Wax F: A montan max obtained by extraction of lignite having an acid value of about 6 to about 10, sold by the Industrial Chemicals Division of American Hoechst Corporation, Somerville, N.J.

9. Hoechst Wax OM: A partly saponified montan-based wax having a saponification value of about 110 to about 125 and an acid value of about 20 to about 25, sold by the Industrial Chemicals Division of American Hoechst Corporation, Somerville, N.J.

10. Methocel J 75 MS: A propylene glycol ether of methyl cellulose having an average propylene glycol ether molar substitution of 0.7 to 1.0 percent, sold by Dow Chemical Co. USA, Midland, Mich. (CAS #9004-65-3).

11. Silicone Alkyd Resin 6260: A 30% silicone-modified air dry soya alkyd resin dispersion in mineral spirits, sold by the Chemical Products Division of Cargill, Carpentersville, Ill.

12. Silicone 805 Resin: An aminofunctional silicone resin dispersion in xylene, sold by the Dow Corning Corporation, Midland, Mich.

13. Silicone 2059 Emulsion: An aqueous cationic emulsion of an aminofunctional silicone polymer, sold by the Silicone Products Department, General Electric Company, Waterford, N.Y.

14. Silicone 2079 Emulsion: An aqueous high viscosity aminofunctional silicone polymer emulsion, sold by the Silicone Products Department, General Electric Company, Waterford, N.Y.

15. Silicone L-42: A surfactant that is a trimethylsiloxy end-blocked copolymer of phenylethyl methylsiloxy groups and dimethylsiloxy groups in the form of a clear liquid having a viscosity at 25° C. of 400±200 centistokes, specific gravity 25/25° C. of 1.020-1.040, melting point of −64° C., flash point of 250° F. minimum, surface tension of 25° C. of 22.0 dynes/cm and 15% maximum volatility at 150° C., 24 hours. This is a nonreactive, organomodified silicone fluid containing pendant aralkyl moieties linked to silicon via Si-C bonds, sold by the Union Carbide Corporation, Sisterville, W. Va.

16. Triton X-102: A nonionic polyoxyethylene (13) octylphenyl ether (CAS #9002-93-1, 9004-87-9, 9036-19-5) having an average of 12 to 13 ethylene oxide units and an HLB value of 14.6, sold by the Rohm & Haas Company, Inc., Philadelphia, Pa.

17. Veegum®T: A complex colloidal magnesium aluminum silcate, sold by the R. T. Vanderbilt Company, Inc., Norwalk, Conn.

18. Witconol 14: A nonionic, oil-soluble ester of oleic acid with a glycerin polymer containing an average of 4 glycerin units, sold by the Organics Division of Witco Chemical Co., Inc., New York, N.Y.

EXAMPLE 1: CREAM POLISH EMULSION

This example demonstrates a preferred composition for an unpigmented cream polish emulsion. The composition had the following formulation:

| Ingredient | Weight Percent (as is basis) |
|---|---|
| Phase I | |
| Acryloid B67MT (45%) | 0.500[a] |
| Alpex C-8415 | 1.200 |
| Beeswax | 1.500 |
| Ganex ® V-216 (96%) | 0.300[b] |
| Hoechst Wax F | 1.000 |
| Silicone Alkyd Resin #6260 (60%) | 0.500[c] |
| Silicone 805 Resin (50%) | 1.00[d] |
| Silicone L-42 (85%) | 0.100[e] |
| Triton X-102 | 0.800 |
| Turpentine, steam distilled | 12.900 |
| Witconol 14 | 1.500 |
| 1,2-dibromo-2,4-dicyanobutane (25% in $H_2O$) | 0.030 |
| Phase II | |
| Cellulose Gum | 0.02 |
| Darvan #2 | 0.10 |
| Methocel J75MS | 0.225 |
| Veegum ® T | 0.010 |
| 1,2-dibromo-2,4-dicyanobutane (25% in $H_2O$) | 0.010 |
| Water, Deionized | 45.715 |
| Phase III | |
| Silicone 2079 Emulsion (60%) | 7.650[f] |
| Silicone 2059 Emulsion (60%) | 0.850[g] |

[a] Weight percent actual resin solids = 0.225
[b] Weight percent actual polymer solids = 0.288
[c] Weight percent actual resin solids = 0.300
[d] Weight percent actual resin solids = 0.500
[e] Weight percent actual polymer solids = 0.085
[f] Weight percent actual polymer solids = 4.590
[g] Weight percent actual polymer solids = 0.510

The cream polish was prepared using the following emulsification technique for preparing w/o emulsions. The solid ingredients of Phase I were charged into the first master vessel with solvent and heated to about 190° F.±5° F. with stirring until the waxes melted and the phases became clear. The liquid portions of Phase I were then added with agitation. The resulting temperature of the oil phase cooled to 165° F.±5° F. The thickener, Phase II, was separately prepared in a second vessel. The water of Phase II was charged into the vessel at 130° F.±5° F. and the preservative was gradually added to the vessel with agitation. The remaining ingredients of Phase II were then slowly added to the vessel and vigorously stirred until homogeneous. The resulting composition of Phase II was subsequently run through a suitable homogenizer, such as a Manton-Gaulin Homogenizer, at 1500 psi and filtered through a #800 filter bag (800 microns).

The cream polish emulsion composition was packaged in glass jars and in cans for storage. If desired, the composition can be packed in tubes, in plastic bottles fitted with appropriate sponge or cloth applicators, and in pressurized aerosol cans charged with appropriate compatible propellents and fitted with an appropriate dispenser valve.

The composition provided the desirable advantages of leather preservation compositions, particularly suitable for leather shoe uppers. The polish was easy to apply for leather articles, spread easily and provided a durable, natural-looking high gloss on drying with minimal or no buffing needed.

The composition of this invention enhances the gloss on new leather shoes. Scuffs absorb the dye and are covered by the composition to form a uniform gloss. Leather shoes that have been waxed previously accept the composition and develop a quality gloss. Heavy prior wax buildup is not dissolved. This composition is water repellent; however, prolonged exposure to water does degrade water repellency. The finish does not water spot. Gloss retention in shoe creases is equivalent to conventional polishes.

EXAMPLE 2: BROWN SHOE POLISH

This example demonstrates a pigment-containing brown shoe polish cream. The cream had the following composition.

| Ingredient | Weight Percent (as is basis) |
| --- | --- |
| Emulsion composition of Example 1 | 98.7 |
| Oil-soluble brown dye | 0.8 |
| Cocamide DEA | 0.5 |
| | 100.0 |

The composition was prepared by charging each ingredient into the vessel in sequence stirring in each ingredient until the composition is homogeneous. The procedure was carried out at substantially ambient room temperature conditions by using a liquid cocamide DEA, such as NINOL ®2012 EXTRA described in the glossary above.

Alternatively, the composition can be prepared by following the method of Example 1 and incorporating the dye and cocamide DEA with the ingredients of phase I.

The polish provided a durable, natural-looking high gloss to brown leather shoes that required minimal buffing. Also, less color ruboff as compared to conventional shoe polishes is experienced.

The present invention has been described with respect to preferred embodiments. It will be clear to those skilled in the art that modifications and/or variations of the disclosed compositions and methods can be made without departing from the scope of the invention set forth herein. The invention is defined by the claims that follow.

We claim:

1. A water-in-oil emulsion composition suitable for treating natural and synthetic leather articles comprising:
   (a) a wax mixture of about 1 part by weight mineral ester wax having an acid value of about 0 to about 55, about 4 parts by weight partly saponified mineral ester wax having an acid value of about 10 to about 45, about 1.5 parts by weight insect wax having an acid value of about 0.2 to about 24;
   (b) a film-forming agent that is a curable material selected from the group consisting of a cyclized rubber, an acrylic ester polymer, a drier-modified alkyl resin, an aminofunctional silicone, and mixtures thereof;
   (c) a film-modifying agent that is a surfactant selected from the group consisting of a surface-active aminofunctional silicone resin, a linear arylalkyl modified polydialkyl siloxane, a linear alkylated copolymer of vinylpyrrolidone with a long chain $C_{12}$ to $C_{22}$ alpha olefin, and mixtures thereof;
   (d) a nonionic, emulsifying agent having an HLB value of about 10 to about 15 and selected from the group consisting of an oil-soluble polyglycerol ester of a hydrophobic fatty acid capable of forming a water-in-oil emulsion, a water-soluble $C_8$ to $C_{18}$ alkylphenol ether with ethylene oxide having an average number of ethylene oxide units of about 5 to about 70, and mixtures thereof;
   (e) about 0.05 to about 0.15 weight percent of an effective amount of an anionic, water-soluble and hydrocarbon insoluble dispersing agent;
   (f) about 0.01 to about 0.5 weight percent of a thickening agent selected from the group consisting of a colloidal alkali metal aluminum silicate, a colloidal alkaline earth metal aluminum silicate, a water-soluble nonionic ester of cellulose, a water-soluble anionic ester of cellulose, a water-soluble nonionic ether of cellulose, a water-soluble anionic ether of cellulose, and mixtures thereof;
   (g) about 4 to about 20 weight percent of an organic solvent selected from the group consisting of a liquid aliphatic hydrocarbon, a liquid aromatic hydrocarbon, and an oleoresinous liquid, said solvent having an average kauri-butanol value about 50, and mixtures thereof;
   (h) an effective amount of a preservative; and
   (i) about 25 to 75 weight percent of deionized water;
   wherein the wax mixture, the film-forming agent, the film-modifying agent and the nonionic emulsifying agent are present in amounts effective to produce a high gloss that is substantially self-polishing.

2. The composition of claim 1 wherein the composition further includes a $C_8$ to $C_{32}$ alkylolamide that is the reaction product of about 2 moles $C_2$ to $C_{12}$ alkanolamine and about 1 mole $C_6$ to $C_{20}$ fatty acid and effective amount of a dye, said dye being constituted by dyes selected from the group consisting of a water-soluble dye, an oil-soluble dye, a pigment, and mixtures thereof and being capable of producing a coloring shoe polish.

3. The composition of claim 2 wherein the alkylolamide is the reaction product of 2 moles diethanolamine and 1 mole coconut fatty acid.

4. The composition of claim 1 wherein the wax mixture comprises about 1 part by weight mineral ester wax having an acid value of about 6 to about 10, about 4 parts by weight partly saponified mineral ester wax having an acid value of about 20 to about 25, about 1.5 parts by weight insect wax having an acid value of about 17 to about 24.

5. The wax mixture of claim 1 wherein the mineral ester wax is montan wax.

6. The wax mixture of claim 1 wherein the partly saponified mineral ester wax is montan-based.

7. The wax mixture of claim 1 wherein the insect wax is beeswax.

8. The wax mixture of claim 4, wherein the mineral ester wax is montan wax, the partly saponified mineral ester wax is montan-based, and the insect wax is beeswax.

9. The composition of claim 8 wherein the alkyd resin is an about 30 percent silicone-modified air dry soya alkyd resin.

10. The composition of claim 1 wherein the nonionic emulsifying agent is selected from the group consisting of an ester of oleic acid and a glycerin polymer containing an average 4 glycerin units, a $C_8$ to $C_9$ alkylphenol ester having an average number of ethylene oxide units of about 12 to about 13, and mixtures thereof.

11. The composition of claim 1 wherein the dispersing agent is a complex polymerized alkali metal salt of a polysulfonated lignin.

12. The composition of claim 1 wherein the thickening agent is selected from the group consisting of a magnesium aluminum silicate, carboxy-, alkyl-, and hydroxy-substituted cellulose, and mixtures thereof.

13. A self-polishing shoe cream polish composition comprising:
   about 6 to about 7 weight percent of a wax mixture comprised of about 1 part by weight mineral ester wax having an acid value of about 6 to about 10, about 4 parts by weight partly saponified mineral ester wax having an acid value of about 20 to about 25, and about 1.5 parts by weight insect wax having an acid value of about 17 to about 24;
   about 0.2 to about 8 solids weight percent of a film-forming agent selected from the group consisting of a cyclized rubber, an acrylic ester polymer, a silicone-modified soya alkyd resin, an aminofunctional silicone resin and mixtures thereof;
   about 0.05 to about 0.4 solids weight percent of a film-modifying agent selected from the group consisting of a surface active aminofunctional silicone, a linear arylalkyl modified polydialkyl siloxane, a linear alkylated copolymer of vinylpyrrolidone with a $C_{16}$ alpha olefin, and mixtures thereof;
   about 0.5 to about 2.5 weight percent of a nonionic emulsifying agent selected from the group consisting of an ester of a hydrophobic $C_{12}$ to $C_{20}$ fatty acid and a glycerin polymer containing an average of 4 glycerin units, a $C_8$ to $C_9$ alkylphenol ether with ethylene oxide having an average number of ethylene oxide units of about 12 to 13, and mixtures thereof;
   about 0.05 to about 0.15 weight percent of a water soluble and hydrocarbon insoluble anionic dispersing agent;
   about 0.01 to about 0.5 weight percent of a thickening agent selected from a group consisting of a colloidal magnesium aluminum silicate, a water-soluble nonionic ether of cellulose, a water-soluble anionic ester of cellulose, and mixtures thereof;
   about 4 to about 20 weight percent of an organic solvent selected from the group consisting of a liquid aliphatic hydrocarbon, a liquid aromatic hydrocarbon and an oleoresinous liquid having a kauri-butanol value above 50, and mixtures thereof;
   an effective amount of preservative; and
   about 25 to 75 weight percent of deionized water.

14. The composition of claim 13 further including about 0.3 to about 0.7 weight percent of an alkylolamide that is the reaction product of about 2 moles diethanolamine and about 1 mole coconut fatty acid, and about 0.5 to about 1 weight percent of a dye.

15. A self-polishing shoe cream polish composition comprising:
   about 6.2 to about 6.8 weight percent of a wax mixture comprised of about 1 part by weight montan wax having an acid value of about 6 to about 10, about 4 parts by weight partly saponified montan-based wax having an acid value of about 20 to about 25, and about 1.5 parts by weight beeswax having an acid value of about 17 to about 24;
   about 7.2 to about 7.5 solids weight percent of a film-forming agent selected from the group consisting of a cyclized rubber, an acrylic ester polymer, a silicone-modified soya alkyd resin, an aminofunctional silicone resin, and mixtures thereof;
   about 0.8 to about 0.9 solids weight percent of a film-modifying agent selected from the group consisting of a surface active aminofunctional silicone, a linear arylalkyl modified polydialkyl siloxane, a linear alkylated copolymer of vinylpyrrolidone with a $C_{16}$ alpha olefin, and mixtures thereof;
   about 0.5 to about 2.0 weight percent of a nonionic emulsifying agent selected from the group consisting of an ester of unsaturated $C_{18}$ fatty acid with a glycerin polymer containing an average of 4 glycerin units, a $C_8$ alkyl phenol ether with ethylene oxide having an average number of ethylene oxide units of about 12 to about 13, and mixtures thereof;
   about 0.08 to about 0.12 weight percent of a water-soluble and hydrocarbon insoluble anionic dispersing agent;
   about 0.15 to about 0.35 weight percent of a thickening agent selected from the group consisting of a colloidal magnesium aluminum silicate, a water-soluble nonionic ether of cellulose, a water-soluble anionic ester of cellulose, and mixtures thereof;
   about 12 to about 20 weight percent of an organic solvent selected from the group consisting of a liquid aliphatic hydrocarbon, a liquid aromatic hydrocarbon and an oleoresinous liquid having a kauri-butanol value above 50, and mixtures thereof;
   an effective amount of a preservative; and
   about 25 to 75 weight percent of deionized water.

16. The composition of claim 15 further including about 0.3 to about 0.7 weight percent of an alkylolamide that is the reaction product of about 2 moles diethanolamine and about 1 mole coconut fatty acid, and about 0.5 to about 1 weight percent of a dye.

17. The composition of claim 1 wherein the composition is in the form of a thixotropic liquid, cream, paste, or aerosol spray.

18. A water-in-oil emulsion composition suitable for treating natural and synthetic leather articles comprising:
   (a) about 6 to 7 weight percent of a wax mixture of about 1 part by weight mineral ester wax having an acid value of about 0 to about 55, about 4 parts by weight partly saponified mineral ester wax having an acid value of about 10 to about 45, about 1.5 parts by weight insect wax having an acid value of about 0.2 to about 24;
   (b) about 0.2 to 8 weight percent of a film-forming agent that is a curable material selected from the group consisting of a cyclized rubber, an acrylic ester polymer, a drier-modified alkyl resin, an aminofunctional silicone resin, and mixtures thereof;
   (c) about 0.05 to 0.5 solids weight percent of a film-modifying agent that is a surfactant selected from the group consisting of a surface-active aminofunctional silicone, a linear arylalkyl modified polydialkyl siloxane, a linear alkylated copolymer of vinylpyrrolidone with a long chain $C_{12}$ to $C_{22}$ alpha olefin, and mixtures thereof;
   (d) about 0.5 to about 2.5 weight percent of a nonionic, emulsifying agent having an HLB value of about 10 to about 15 and selected from the group consisting of an oil-soluble polyglycerol ester of a hydrophobic fatty acid capable of forming a water-in-oil emulsion, a water-soluble $C_8$ to $C_{18}$ alkylphenol ether with ethylene oxide having an average number of ethylene oxide units of about 5 to about 70, and mixtures thereof;
   (e) about 0.05 to about 0.15 weight percent of an effective amount of an anionic, water-soluble and hydrocarbon insoluble dispersing agent;

(f) about 0.01 to about 0.5 weight percent of a thickening agent selected from the group consisting of a colloidal alkali metal aluminum silicate, a colloidal alkaline earth metal aluminum silicate, a water-soluble nonionic ester of cellulose, a water-soluble anionic ester of cellulose, a water-soluble nonionic ether of cellulose, a water-soluble anionic ether of cellulose, and mixtures thereof;

(g) about 4 to about 20 weight percent of an organic solvent selected from the group consisting of a liquid aliphatic hydrocarbon, a liquid aromatic hydrocarbon, and an oleoresinous liquid, said solvent having an average kauri-butanol value about 50, and mixtures thereof;

(h) an effective amount of a preservative; and (i) about 25 to 75 weight percent of deionized water.

* * * * *